United States Patent [19]
Bäversten et al.

[11] Patent Number: 5,930,318
[45] Date of Patent: Jul. 27, 1999

[54] METHOD AND A DEVICE FOR NUCLEAR FUEL HANDLING

[75] Inventors: Bengt Bäversten; Karl-Erik Nyström; Anders Rosengren; Antti Suvanto, all of Västerås, Sweden

[73] Assignee: ABB Atom AB, Vasteras, Sweden

[21] Appl. No.: 08/841,577

[22] Filed: Apr. 30, 1997

[30] Foreign Application Priority Data

May 10, 1996 [SE] Sweden ................................. 9601807

[51] Int. Cl.[6] .................................................. G21C 19/10
[52] U.S. Cl. .......................... 376/264; 376/271; 376/262
[58] Field of Search ................................ 376/262, 264, 376/268, 271

[56] References Cited

U.S. PATENT DOCUMENTS

| | | | |
|---|---|---|---|
| 3,941,259 | 3/1976 | Hoffmeister et al. | 376/271 |
| 4,308,100 | 12/1981 | Albin | 376/271 |
| 4,824,633 | 4/1989 | Ichikawa et al. | 376/271 |
| 5,104,612 | 4/1992 | Rousar | 376/248 |
| 5,291,532 | 3/1994 | Townsend et al. | 376/268 |
| 5,369,676 | 11/1994 | Ortega et al. | 376/271 |
| 5,687,207 | 11/1997 | Meuschke et al. | 376/271 |

*Primary Examiner*—Daniel D. Wasil
*Attorney, Agent, or Firm*—Pollock, Vande Sande & Amernick

[57] ABSTRACT

The present invention provides a method and apparatus for fuel handling in a nuclear reactor. The nuclear reactor has a reactor vessel comprising a reactor core with a plurality of fuel assemblies and control rods. A fuel pool is arranged adjacent to the reactor vessel. A group comprising at least a plurality of fuel assemblies is simultaneously lifted out of or into the reactor vessel with a single gripper, the gripper having a plurality of gripping devices. The group is transported between the reactor vessel and the fuel pool by means of the gripper.

6 Claims, 4 Drawing Sheets

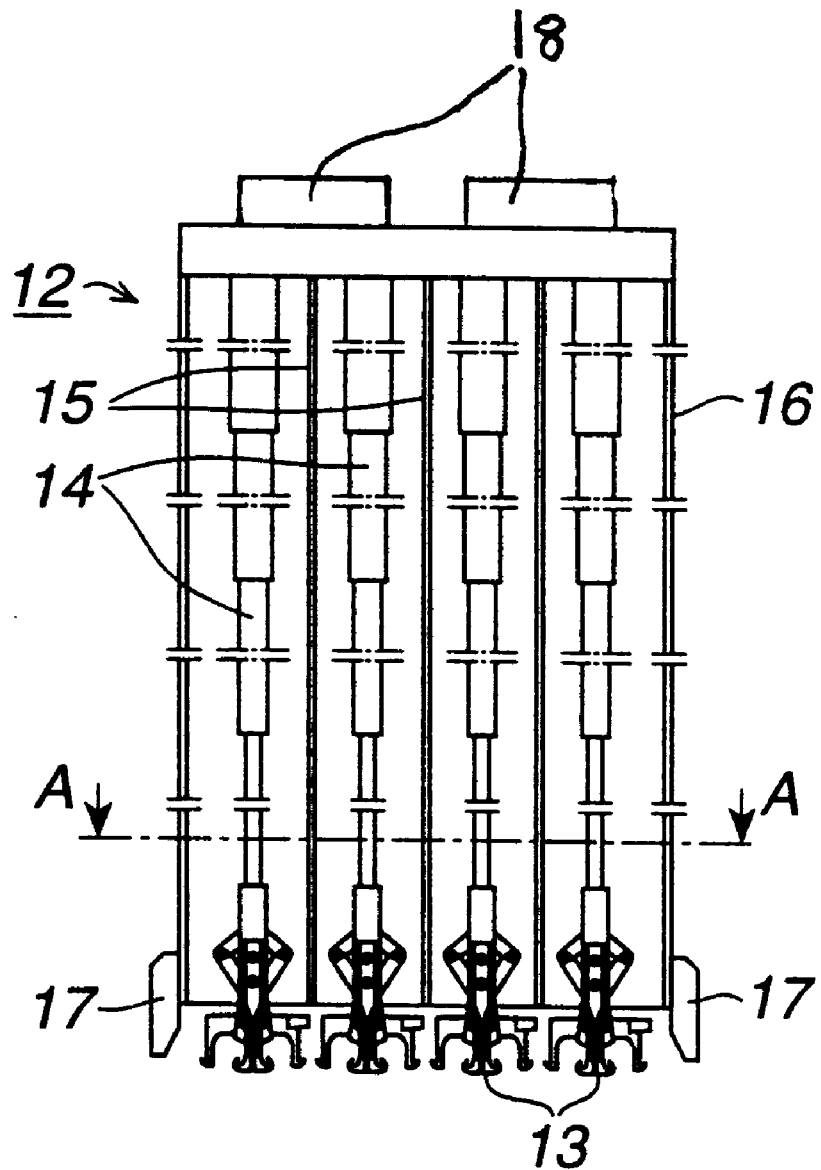

METHOD AND A DEVICE FOR NUCLEAR FUEL HANDLING

TECHNICAL FIELD

The present invention relates to a method and a device for handling fuel assemblies in a light-water nuclear reactor comprising a reactor vessel with a reactor core. More particularly, the invention relates to the handling of fuel assemblies which occurs when fuel assemblies are replaced or moved to a new position when the reactor vessel or parts connected thereto are serviced and therefore have to be emptied of fuel assemblies.

DESCRIPTION OF RELATED ART

A light-water nuclear reactor plant comprises a reactor vessel which encloses a reactor core. The reactor core comprises a large number of fuel assemblies. More particularly, the core normally comprises between 400 and 1000 fuel assemblies. A fuel assembly comprises a bundle of fuel rods. The fuel rods in turn comprise pellets of a nuclear fuel. A coolant in the form of water is arranged to flow from below and up through the core to cool the fuel rods while nuclear fission is in progress. The heated coolant is evaporated whereupon it is passed to a turbine for conversion into electric energy.

After a certain burnup time of the fuel assemblies, it is normal either to reject them or to rearrange them within the fuel core in order to burn them out further. Such a refuelling or rearrangement of fuel takes place upon shutdown of the nuclear power plant. During the shutdown, work is normally also carried out in the reactor vessel and in other systems which are connected to the reactor vessel. Such a shutdown is very costly and takes approximately three to eight weeks. Therefore, it is desirable to do whatever is possible to shorten this shutdown time to the shortest possible time.

The refuelling in a nuclear power plant thus comprises (a) replacing burnt-up fuel assemblies with new ones, and (b) rearranging a large number of fuel assemblies in the core to obtain optimum burnup. During refuelling, the fuel assemblies are normally handled one by one. When the reactor vessel is opened to make the fuel assemblies accessible, a handling tool is moved down into the core and is brought to grip a fuel assembly which is to be temporarily placed in a fuel pool. Normally, control rods arranged between the fuel assemblies are left in the reactor vessel. Additional fuel assemblies are lifted out of the core and placed at an arbitrary locations in the pool. Thereafter, new fuel assemblies are lifted from the pool into the reactor vessel to the new empty positions. The fuel assemblies are thus lifted one by one. The fuel assemblies which are to be rearranged within the core are normally moved directly from their old to their new positions.

In the event that work has to be carried out in the reactor vessel or in adjacent systems, such as pumps directly connected to the reactor vessel, a suitable number of fuel assemblies have to be lifted out therefrom and be temporarily placed at an arbitrary location in the fuel pool. In certain cases, the whole reactor vessel may have to be emptied of fuel assemblies.

The lifting of the fuel assemblies one by one out of and into the reactor vessel, respectively, is one of the independent work operations during the shutdown which takes a relatively large proportion of the total shutdown time. The purpose of the present invention is to provide a method of reducing the time of the fuel handling and hence the total shutdown time.

SUMMARY OF THE INVENTION

The present invention relates to a method and a device which considerably reduce the time of a shutdown where fuel assemblies are lifted out of or into a reactor vessel.

According to one aspect of the method according to the invention, the whole of, or parts of, the reactor vessel is/are transported simultaneously from the reactor vessel to the fuel pool located adjacent thereto. The transport takes place in a forced manner by moving groups containing a plurality of fuel assemblies and/or control rods simultaneously between the reactor vessel and the fuel pool. The groups contain fuel assemblies and/or control rods with a mutual order corresponding to the order of the fuel assemblies in the reactor vessel.

According to the invention, a gripper is arranged for lifting and/or transport equipment is arranged, for example, in a reactor hall surrounding the reactor vessel. The gripper comprises a number of gripping devices corresponding to the number of fuel assemblies to be lifted out of or into the reactor vessel in a group. Further, the gripper is adapted to transport the removed group of fuel assemblies between the reactor core and the fuel pool. The group may also contain control rods which are lifted out together with the fuel rods. The gripper is thus loaded with a plurality of fuel assemblies and possibly fuel rods in or above the core, whereupon it transports the group of the fuel assemblies and possibly control rods to the fuel pool where these are lowered for temporary storage in a conventional fuel stand. After positioning the removed fuel assemblies in the fuel stand in the fuel pool, the gripper is again moved to a position above the core where it is arranged in a position for lifting out a new group of fuel assemblies and control rods, if any. When it is time to lift the fuel assemblies and the possible control rods in the reactor core, the above method steps are reversed.

The advantage of the invention is that a considerable gain in time can be made by lifting a plurality of fuel assemblies and possibly control rods simultaneously out of/into the reactor vessel. The total time for the handling of fuel assemblies and/or control rods can thus be considerably reduced. This saving of time results in a considerable saving of costs.

BRIEF DESCRIPTION OF THE DRAWINGS

The invention will be most readily understood with reference to the accompanying drawings.

FIG. 5 shows a gripper of the present invention with means for increasing and decreasing distance between the fuel assemblies.

DESCRIPTION OF THE PREFERRED EMBODIMENTS

Figure 1:
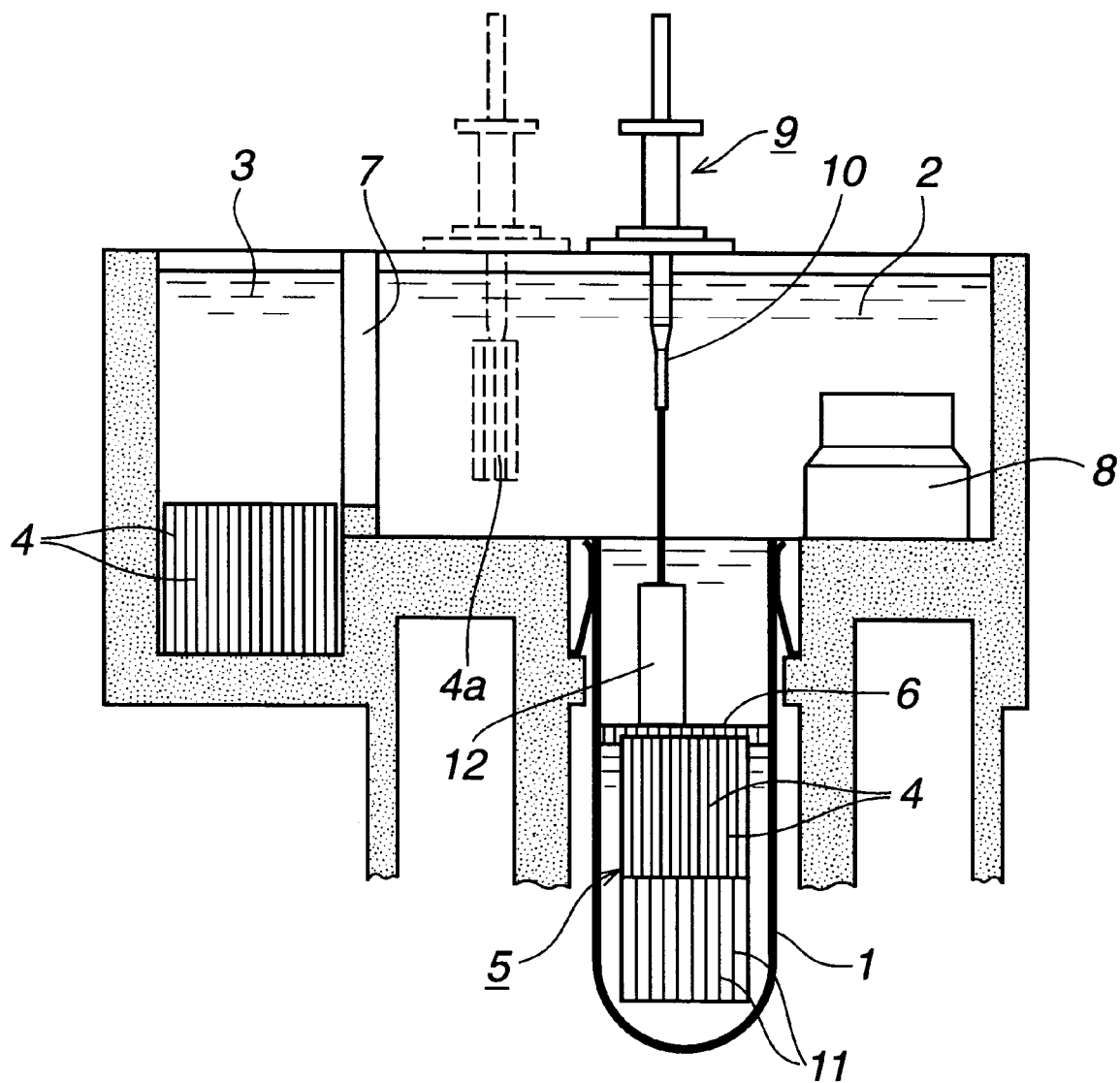
FIG. 1 schematically shows, in a view from the side, a reactor vessel in a reactor pool and an adjacently located fuel pool.

FIG. 1 shows part of a nuclear power plant comprising a reactor vessel 1 with a removed reactor vessel cover, not shown in the figure, arranged in a water-filled reactor pool 2. Further, a so-called fuel pool 3 is shown arranged adjacent to the reactor pool 2. The fuel pool 3 is substantially designed for temporary storage of new and completely or partially burnt-up fuel assemblies 4, respectively. The reactor vessel 1 comprises a core 5 with a plurality of fuel assemblies 4 and a core grid 6 arranged above the core 5. The reactor pool 2 is connected to the fuel pool 3 via a closable opening 7. The other internal parts 8 of the reactor can be temporarily arranged in the reactor pool 2.

During shutdown of the nuclear reactor, the reactor vessel 1 is filled with water and the reactor vessel cover removed. Then, the reactor pool 2 above the reactor vessel 1 is filled with water and the gate 7 between the reactor pool 2 and the fuel pool 3 is opened. Internal reactor parts 8 arranged above the core 5 are lifted out and arranged in the reactor pool 2. The core grid 6 and the fuel assemblies 4 arranged below the grid are now available for handling equipment 9 arranged in the reactor hall. The handling equipment 9 comprises, for example, a telescopic arm 10, to the lower end of which a gripper 12 may be attached. Alternative embodiments of the gripper 12 are shown in more detail in FIGS. 3 and 4. The gripper 12 is lowered down into the reactor vessel 1 and lifts up a group 4a of fuel assemblies 4 therefrom. The fuel assemblies in the raised group 4a have the same mutual positions in the group as they have when they are arranged in the core 5 of the reactor vessel 1. The gripper then transports the group 4a to the fuel pool 3 by means of the handling equipment 9. FIG. 1 shows in dashed lines the gripper 12 during transport of a group 4a of fuel assemblies 4.

Figure 2:
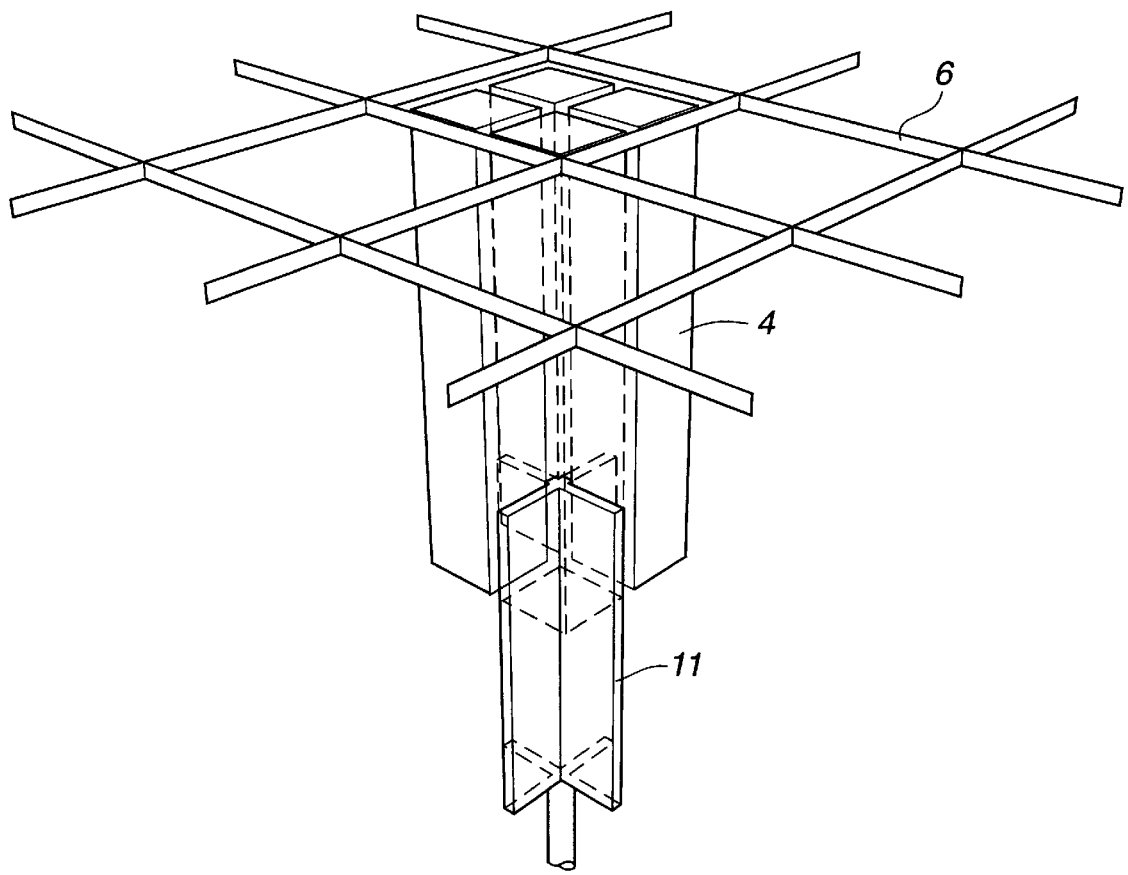
FIG. 2 shows part of a core grid arranged with a core grid square above a core module.

The fuel assemblies 4 are lifted out through the openings in the core grid 6. FIG. 2 shows, in principle, the appearance of the core grid 6. The core grid 6 comprises a grid. The size of an opening in the grid corresponds to the size of a core module, that is, four adjacently located fuel assemblies 4 and one cruciform control rod 11 arranged therebetween. The control rods 11 may either be lifted out together with the fuel assemblies 4 or be left in the reactor core 5. The removed control rods are placed temporarily in the fuel pool 3 together wit h the fuel assemblies 4.

In the fuel pool 3 the groups 4a are arranged in a conventional fuel stand (not shown). The upper limiting surface of the fuel stand in the fuel pool 3 is preferably made with a supporting structure with a shape corresponding to that of the core grid 6. in this way, the handling is facilitated with the aid of the gripper 12 used in that the gripper can be supported and guided with the a id of the supporting structure and the core grid 6, respectively, in the same way both in the core 5 and in the fuel pool 3.

Figure 3A:
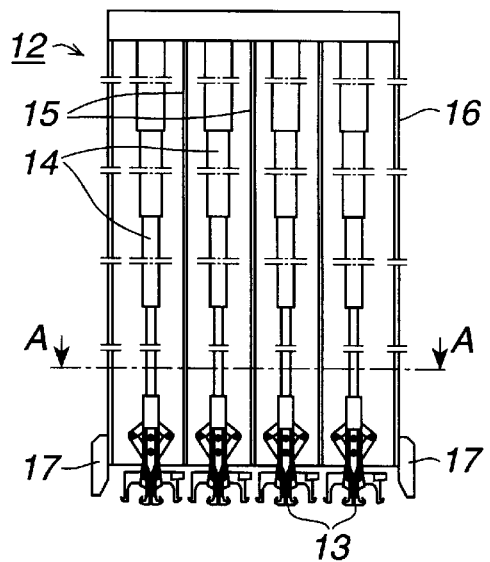
FIG. 3a shows, in a view from the side, a gripper according to the invention for lifting a group of fuel assemblies.
Figure 3B:
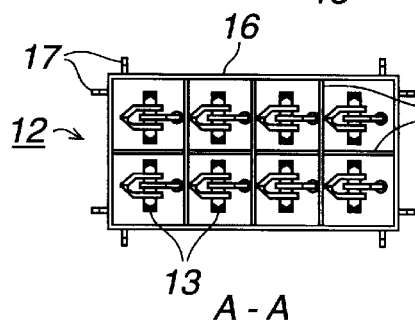
FIG. 3b shows, in a section 3b—3b in FIG. 3a, the lower part of the handling tool.

FIGS. 3a and 3b show a gripper 12 comprising eight gripping devices 13, one for each fuel assembly 4 to be lifted in a group 4a of eight fuel assemblies 4. Each gripping device 13 is connected to, for example, a telescopic arm 14 for lifting of the group 4a into and out of the core 5 or the fuel pool 3, respectively. The gripper 12 is intended for lifting fuel assemblies 4 only and is therefore provided with neutron-absorbing partitions 15. The partitions 15 are arranged such that two or three walls each surround a fuel assembly 4 lifted out of the core 5 or the fuel pool 3. The object of the partitions 15 is to prevent the occurrence of criticality when the fuel assemblies 4 are in this position.

The corresponding fuel stand in the fuel pool 3 is preferably provided with corresponding neutron-absorbing walls 15 in corresponding positions with the same purpose.

In one embodiment of the invention, as shown in FIGS. 3a and 3b, the gripper 12 may be provided with a sleeve 16 into which the fuel assemblies 4 are drawn. The sleeve 16 extends substantially along the whole length of the fuel assembly 4. At its end facing the core 5 and the fuel pool 3, respectively, the sleeve 16 is provided with guiding means 17. The object of the guiding means 17 is to position the gripper 12 with the aid of the core grid 6 and the supporting structure, respectively, in the fuel pool 3 such that the gripping devices are positioned correctly to be able to grip the fuel assemblies arranged below the core grid 6 and the supporting structure, respectively.

The provision of the sleeve 16 is one way of preventing the fuel assemblies 4, drawn into the sleeve, from separating from each other or approaching each other in an unsuitable way during the transport.

Figure 4A:
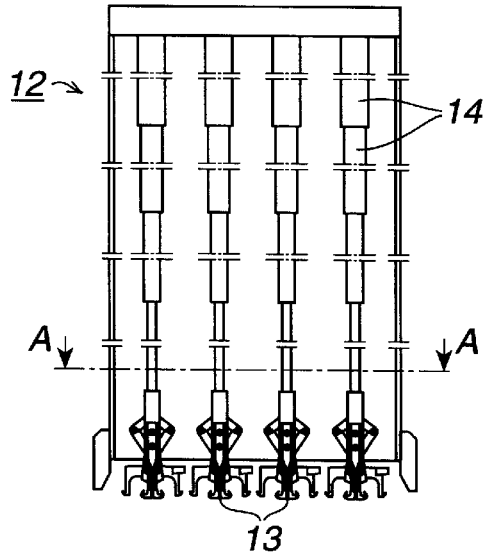
FIG. 4a shows, in a view from the side, a gripper according to the invention for lifting of core modules.
Figure 4B:
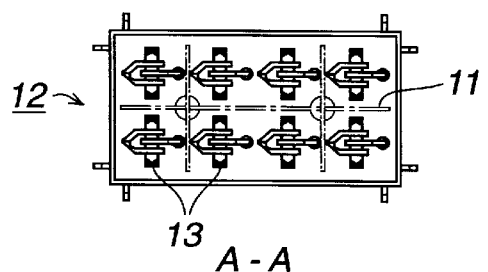
FIG. 4b shows, in a section 4b—4b in FIG. 4a, the lower part of the handling tool.

FIGS. 4a and 4b show a gripper 12 intended for handling of core modules wherein the control rod 11 is lifted together with four fuel assemblies 4. The gripper 12 according to FIGS. 4a, 4b differs from that shown in FIGS. 3a, 3b in that it has no partitions 15. When the control rod 11 is lifted out together with the fuel assemblies 4, no neutron-absorbing means is needed in the gripper 12. The gripper 12 in FIG. 4a is intended to simultaneously handle two core modules with one control rod 11 each.

The gripper 12 can be designed according to the same principles as shown here for groups 4a with more or fewer fuel assemblies 4 and core modules, respectively. If two fuel assemblies 4 are to be lifted, preferably two fuel assemblies 4 positioned diagonally in relation to each other are lifted. The gripping devices 13 shown are shown in two-row design. It is, of course, possible to design the gripper 12 as a single-row or multi-row gripper depending on the design of the nuclear reactor in question.

The positions for the groups 4a of fuel assemblies in the fuel pool may either be arbitrary or determined in such a way that fuel assemblies, and any control rods 11, removed from the reactor vessel 1 are given the same mutual order as they had when they were arranged in the reactor vessel 1.

In one embodiment of the invention, the gripper comprises means 18 to increase and decrease, respectively, the mutual distance between the fuel assemblies once they have been lifted by the gripper. This is advantageous when the fuel stand in the fuel pool 3 does not have the same pitch measure as the core grid 6.

What is claimed is:

1. A method of fuel handling in a nuclear reactor having a reactor vessel comprising a reactor core with a plurality of fuel assemblies and control rods and wherein a fuel pool is arranged adjacent to said reactor vessel, said method comprising the steps of:

lifting simultaneously a group comprising a plurality of fuel assemblies into or out of said reactor vessel with a single gripper; and transporting said group between said reactor vessel and said fuel pool by means of said gripper.

2. The method according to claim 1 wherein said group comprises at least one core module.

3. An apparatus for fuel handling in a nuclear reactor having a reactor vessel comprising a reactor core with a plurality of fuel assemblies and control rods and wherein a fuel pool is arranged adjacent to said reactor vessel, said apparatus comprising:

handling equipment movable between said fuel pool and said reactor vessel;

a single gripper extending from said handling equipment;

a plurality of gripping devices attached to said gripper, each said gripping device provided with means for lifting a fuel assembly, so that said gripping devices of said single gripper simultaneously lift a plurality of fuel assemblies into or out of said reactor vessel or fuel pool.

4. The apparatus according to claim 3 wherein said gripper is adapted to lift at least one core module.

5. The apparatus according to claim 3 further comprising partitions of neutron absorbing material arranged in said gripper such that said fuel assemblies lifted therein are separated by said partitions.

6. The apparatus according to claim 3 wherein said gripper further comprises a sleeve having a length corresponding to a length of said fuel assemblies and arranged around said gripper to enclose said fuel assemblies lifted therein.

* * * * *